United States Patent [19]

Petrovich et al.

[11] 4,129,528

[45] Dec. 12, 1978

[54] POLYAMINE-EPIHALOHYDRIN RESINOUS REACTION PRODUCTS

[75] Inventors: John P. Petrovich, Chesterfield; Donald N. Van Eenam, Des Peres, both of Mo.

[73] Assignee: Monsanto Company, St. Louis, Mo.

[21] Appl. No.: 685,227

[22] Filed: May 11, 1976

[51] Int. Cl.² ............................................. C08F 00/00
[52] U.S. Cl. ........................... 260/823; 260/29.2 EP; 528/405
[58] Field of Search ............ 260/2 BP, 2 EN; 526/23, 526/46, 11.2

[56] References Cited

U.S. PATENT DOCUMENTS

| | | | |
|---|---|---|---|
| 2,595,935 | 5/1952 | Daniel et al. | 92/3 |
| 3,248,353 | 4/1966 | Coscia | 260/29.2 |
| 3,520,774 | 7/1970 | Roth | 162/164 |
| 3,700,623 | 10/1972 | Keim | 260/80.3 R |
| 3,803,237 | 4/1974 | Lednicer et al. | 260/584 R |

*Primary Examiner*—Harold D. Anderson
*Assistant Examiner*—E. A. Nielsen
*Attorney, Agent, or Firm*—R. Bruce Blance

[57] ABSTRACT

Resinous reaction products wherein the hydrohalide salt of a polyamine is condensed with an epihalohydrin provides improved wet strength and improved dry strength to cellulosic substrates such as paper, paperboard, and the like. It has been found that the wet strength and dry strength of paper products can be significantly improved by using a resinous reaction product resulting from the removal of halide ions from the polyamine hydrohalide salt before it is condensed with an epihalohydrin.

8 Claims, No Drawings

POLYAMINE-EPIHALOHYDRIN RESINOUS REACTION PRODUCTS

BACKGROUND OF THE INVENTION

This invention relates to ionic resins, and more particularly, to resinous reaction products of a polymer of an amine and an epihalohydrin and to their use in the manufacture of paper having good wet strength properties and good dry strength properties.

The use of the reaction products of a polymer of an amine and an epihalohydrin to improve the wet strength and dry strength of cellulosic substrates is well known to the art. Indeed, this class of materials is widely used in the manufacture of paper products and millions of pounds of these resinous products are consumed each year to satisfy the needs of the paper industry.

A number of processes and compositions are taught in the prior art for the preparation and use of such resinous reaction products. As an example, U.S. Pat. 2,595,935 discloses paper products of improved wet strength containing the reaction product of polyalkanepolyamines and bifunctional or polyfunctional halohydrins, such as epichlorohydrin. German Pat. No. 955,835 discloses a process for water-proofing paper by adding to the pulp basic products free from reactive halogen or epoxy groups. These products are obtained by condensing polyamines with cross-linking compounds, such as epichlorohydrin or dichloroethane. Such products also increase the wet strength of paper. U.S. Pat. 2,834,675 discloses resinous compositions of dihaloalkanes and polyalkylenepolyamines which may be added to paper pulp to improve the wet strength. U.S. Pat. No. 3,700,623 discloses the reaction products of an epihalohydrin and a polymer of a diallylamine useful as wet strength agents, and additionally, give superior dry strength properties to paper. U.S. Pat. No. 3,855,158 discloses cationic resinous compositions comprising the reaction product of an adduct of certain dihaloalkanes and polyalkylenepolyamines and certain epihalohydrins to be added to cellulosic substrates to increase the wet strength of the product.

Although the teachings of the prior art provide products that give paper satisfactory wet strength and dry strength properties, it has now been found that fast curing, ionic, thermosetting resins can be prepared by the process of the present invention, and that the resins so produced provide all of the advantages of the prior art resins and, in addition, provide advantages not achieved by products disclosed in the prior art. For example, the resins of the present invention are more efficient since less resin is required to provide equivalent wet strength and dry strength properties to cellulosic substrates, such as paper, paperboard, and the like.

In addition, the prior art discloses that less than 80% of the epihalohydrin will react with a polyamine hydrohalide salt or with a polyamine containing high levels of halide ion, such as by neutralization of the hydrohalide with a base. Although Applicants do not wish to be bound by any particular theory, it is believed that the halide ion reacts with some of the epihalohydrin, making it unreactive and/or less reactive with the polyamine. In the present invention, a substantial amount (i.e., greater than 50%) of the halide ion is removed from the polyamine before condensation with an epihalohydrin, with the result that more of the epihalohydrin is available to react with the polyamine. The resulting resinous reaction product provides superior wet strength and dry strength when applied to cellulosic substrates.

SUMMARY

It is an object of this invention to provide a resinous composition. It is another object of this invention to provide a resinous composition suitable for use as a wet strength agent for paper.

These and other objects are achieved in a method for providing a resinous composition wherein a polyamine is contacted with an epihalohydrin, the improvement which comprises removing the halide ion from the polyamine and thereafter contacting the polyamine with an epihalohydrin. There is then provided a resinous composition comprising the reaction product of a substantially halide-free polyamine and from about 0.1 to about 2.0 moles of an epihalohydrin per mole of amine group.

As used herein, the term "paper" includes all materials which are encompassed within the ordinary and usual meaning of the word, including but not limited to, cellulosic and other vegetable fibers formed into thin felts or nonwoven sheets. The term "amine" shall mean any amine that is capable of being polymerized by vinyl polymerization and the like, or adducted through functional reaction and the like to form a prepolymer that will react with an epihalohydrin.

Broadly, described, the resinous compositions of the present invention are provided by the following method. An amine, which can be diamine, a triamine, or a polyamine, with or without vinyl unsaturation, is polymerized, or adducted with suitable compounds, to cause polymer growth to form a prepolymer containing a significant amount of a halide ion. Thereafter, a substantial amount of the halide ions present are removed from the amine prepolymer and then the amine prepolymer is contacted with an epihalohydrin to form the resinous products of the present invention.

The amines of the present invention include any number of monoamines, diamines, triamines and polyamines. It is only necessary that the amine be capable of being formed into a prepolymer capable of interaction with epihalohydrin to produce a water-soluble, thermosetting, resinous composition.

The amines of the present invention are those known to the art and include alkylene, aralkylene, alkarylene and arylene diamines, triamines and polyamines. Suitable alkylene diamines, triamines and polyamines include: 1,4-butanediamine; 1,6-hexanediamine; 3,3'-iminobispropyleneamine; diethylene triamine; N-methyl-1,3-propanediamine and the like. Suitable aralkylene amines, which have both aromatic and aliphatic structures, include: 1-phenyl-2,4-pentane diamine; 2-phenyl-1,3-propanediamine and the like. Suitable arylene diamines, triamines and polyamines include ortho, meta and para phenylene diamine and the like. Alkylene diamines, triamines and polyamines are preferred, and diamines, such as hexanediamine, are especially preferred.

As will occur to those skilled in the art, mixtures of amines in the same class or in a different class can be used with satisfactory results. Furthermore, the amines need not be pure but can be technical grade, provided of course, that the impurities do not interfere with the subsequent reactions.

As is known to those skilled in the art, these polyfunctional amines undergo condensation polymerization with suitable difunctional compounds such as dihaloalkanes, exemplified by dichloroethane, 1,3-dichloro-2-hydroxy propane, 1,3-dibromopropane, cis- and trans-1,4-dichlorobutene-2, and the like. As is known to those skilled in the art, the mole ratio of dihaloalkane to amine can vary within wide limits. Satisfactory amine prepolymers can be prepared with a mole ratio of dihaloalkane to amine from about 0.3:1 to about 1:1, but it is preferred to use a mole ratio of about 0.4:1 to about 0.9:1, say about 0.5:1 to about 0.8:1. When using an alkylene diamine for condensation polymerization with a difunctional molecule to form an adduct, such as 1,6-hexamethylenediamine and a dihaloalkane, it is preferred to use dichloroethane.

Moreover, it is known that mineral acid salts of diallylamines and alkyl-substituted diallylamines can be homopolymerized or copolymerized using free-radical polymerization techniques to provide water-soluble, linear, polymer salts. As is known in the art, diallylamines are free-radical inhibitors and, thus, mineral acid salts of diallylamines are polymerized to provide polymer units. For the purposes of this invention, the term "hydrohalide" means not only hydrochloride, hydrobromide, hydroiodide and the like, but also includes hydrosulfates, hydrophosphates and the like, known to the art to be equivalent to hydrohalides in free-radical polymerizations. Specific hydrohalide salts of the diallylamines which can be polymerized to provide the amine prepolymer units of the present invention include: diallyl amine hydrochloride, N-methyl diallylamine hydrochloride, N-ethyl diallylamine hydrochloride, and the like.

After the hydrohalide salt of the amine prepolymer has been prepared, the halide ions (or their equivalents) are then removed from the amine prepolymer. As will occur to those skilled in the art, any number of techniques can be used to remove a substantial amount (i.e., greater than 50 mole %) of the halide ion from the amine prepolymer. As an example, ion exchange techniques can be used, or the hydrohalide salt of the amine prepolymer can be contacted with a strong base, such as a hydroxide of the alkali and alkaline earth metals. In the preferred embodiment, the hydrohalide salt of the amine prepolymer is contacted with a hot aqueous solution of lithium hydroxide, sodium hydroxide or potassium hydroxide under conditions to provide a phase separation between the substantially halide-free amine prepolymer and an aqueous salt layer. Sodium hydroxide is especially preferred.

After a substantial amount of the halide ion has been removed from the amine prepolymer, the amine prepolymer is then contacted with an epihalohydrin. Suitable epihalohydrins that can be used in the present invention include epichlorohydrin, epibromohydrin, and epiiodohydrin. Epichlorohydrin is preferred.

Generally, aqueous solutions of the resinous compositions of the present invention in which the epihalohydrin is reacted with the amine prepolymer in a molar proportion of epihalohydrin to amine group of the prepolymer above about 2.5:1 are not thermosetting, and those below about 0.8:1 generally gel. Thus, for a resinous composition of the present invention to be useful as a wet strength or dry strength agent, it is preferred that the molar ratio of epichlorohydrin to amine group of the amine prepolymer is between about 0.8 and about 2.0:1. For uses of the resinous composition of the present invention for other purposes within the paper industry, say for a retention aid and the like, the molar ratio of epihalohdyrin to amine group in the amine prepolymer can be below about 0.8:1 and even down as low as 0.1:1.

Aqeuous solutions or dispersions of the novel resinous compositions of the present invention, particularly those containing an epihalohyrin to amine group molar ratio of between about 1.0:1 and about 1.8:1 are particularly valuable for increasing the wet strength and dry strength of paper. Generally, such aqueous solutions contain 5 to 40% of uncured resin solids, preferably 20% to 35%, and 60% to 95%, preferably 65% to 80% by weight of water, based on the total weight of the aqueous solution. Any concentration of the uncured resin solids of the present invention may be used to increase the wet strength of paper except as limited by handling conditions. Likewise, aqueous solutions or dispersions of the novel resinous compositions of the present invention can be used at any viscosity except as limited by handling conditions.

When the reaction products of the present invention are applied to cellulosic substrates, such as various paper products of various types, conventional techniques known to those skilled in the art may be used. For example, preformed and partially or completely dried paper may be impregnated by immersion in or spraying with an aqueous solution of the resin, following which the paper may be heated for about 0.5 to 30 minutes at temperatures of 90° C. to 100° C. or higher, to dry the paper and cure the resin to a water-insoluble condition. The resulting paper has increased wet strength and, therefore, this method is well suited for the impregnation of paper towels, absorbent tissue, and the like, as well as heavier stocks, such as wrapping paper, bag paper, and the like, to impart wet strength and dry strength characteristics to the paper.

The preferred method of incorporating these resins in paper, however, is by internal "wet end" addition prior to the sheet formation wherein advantage is taken of the substantivity of the resins for hydrated cellulosic fibers. In practicing this method, an aqueous solution of the resin in its uncured and hydrophilic state is added to an aqueous suspension of paper stock in the beater, stock chest, Jordan engine, fan pump, or at any other suitable point ahead of sheet formation. The sheet is then formed and dried in the usual manner.

The resinous composition of the present invention imparts wet strength and dry strength to paper when present in the paper in amounts of about 0.05 to 5 weight percent or more, based on the dry weight of the paper. The quantity of resin to be added to the aqueous stock suspension will depend upon the degree of wet strength and/or dry strength desired in the finished product, and on the amount of resin retained by the paper fibers.

The uncured resinous compositions of the present invention incorporated in paper in any suitable manner as described above, may be cured under acid, neutral or alkaline conditions, i.e., at a pH from about 4.0 to 12, by subjecting the paper to a heat treatment for about 0.5 to 30 minutes at a temperature from about 90° to 100° C. Optimum results, however, are obtained under alkaline conditions. For example, in those applications where short cure times are required, for example, fine papers such as sanitary tissues, the resinous compositions of the present invention may be made alkaline at a pH between about 8 and about 13 prior to use. Such a pretreatment results in shorter cure times and increased wet strength. Any strong base may be used, such as an alkali metal hydroxide or alkoxide. Sodium hydroxide is preferred.

DESCRIPTION OF THE PREFERRED EMBODIMENTS

In the preferred embodiment of this invention, resinous compositions comprise the reaction product of A. a substantially halide-free prepolymer of 1. a dihaloalkane represented by the formula

FORMULA I

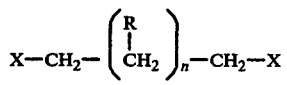

wherein X represents chloro, bromo or iodo, R represents hydrogen, hydroxy or an alkyl group having 1 to 4 carbon atoms, and n is 0 or 1, and 2. a polyalkylenepolyamine represented by the formula

FORMULA II wherein m is an integer of from 2 to about 15 and p is 0 to 3 in a mole ratio of from about 0.3:1 to about 1:1, and

B. an epihalohydrin selected from the group consisting of epichlorohydrin, epibromohydrin, and epiiodohydrin, in a mole ratio of from about 0.8 to about 2.0 moles of epihalohydrin per mole of amine group in the adduct.

The dihaloalkanes defined by Formula I may be reacted with polyalkylenepolyamines defined by Formula II by techniques known to those skilled in the art, such as those described in U.S. Pat. No. 2,834,675. Broadly described, the dihaloalkanes are reacted with the polyalkylenepolyamines in the aforementioned ratios at temperatures from about 25° C. to reflux or above, preferably from about 60° C. to 90° C., in a solvent such as water, water miscible alcohols or mixtures thereof. Water is preferred. Any suitable solids content of the reactants in the reaction mixture may be employed. It is most advantageous that initially they be high, say 60 to 90% by weight based on the total weight of the reaction mixture.

As the reaction proceeds, the viscosity increases, and it is conveniently kept from G to S on the Gardner-Holdt scale, measured at 25° C., by the addition of solvent. In order to maintain a reasonable reaction rate, any strong base or other acid acceptor may be added to neutralize a portion or all of the hydrohalide formed. These bases include alkali metal hydroxides or alkali metal alkoxides, and sodium hydroxide is especially preferred. The reaction is carried out until there are substantially no free dihaloalkanes present in the reaction mixture.

The adducts of this invention obtained by reacting the dihaloalkane with the polyalkylenepolyamine contain essentially linear or branched units with little or no cyclic units. It is preferred that about 85% of the units of the adducts be linear or branched, and it is even more preferred that more than about 95% of the adducts be linear or branched.

After the prepolymer of the dihaloalkane and the polyalkylenepolyamine has been prepared, the prepolymer is contacted with a sufficient amount of an alkali metal hydroxide, alkali earth hydroxide, or alkali metal alkoxide (either solid or solution) to substantially neutralize the hydrohalide and any halide ion in the amine prepolymer, and to separate it from the amine prepolymer. A 50% solution of sodium hydroxide is preferred.

In the more preferred embodiment, a 50% solution of sodium hydroxide at a temperature between about 50° and about 100° C., say about 70° to 80° C., is thoroughly mixed with a halide-containing prepolymer. The mixture is allowed to settle. The resulting substantially halide-free polyamine, i.e., a polyamine wherein less than half of the amine groups in the polyamine consist of amine hydrohalide groups or equivalent levels of halide ions, separates usually to the top of the aqueous salt-sodium hydroxide solution or suspension. The lower aqueous solution or suspension containing any unreacted sodium hydroxide and sodium halide is removed and discarded. The substantially halide-free polyamine is then redissolved in, or diluted further with, water for subsequent reaction with the epihalohydrin.

Any concentration of the prepolymer can be used as long as the prepolymer is suitable for further reaction with the epihalohydrin. A suitable concentration of prepolymer is from about 25 to about 55% by weight, based on the total weight of the solution of the prepolymer. As will occur to those skilled in the art, the concentration of prepolymer in the solution can be adjusted by the addition or removal of water to achieve any desired viscosity. A viscosity of about A-3 to H on the Gardner-Holdt scale at 25° C. is preferred for reaction with the epihalohydrin.

The substantially halide-free prepolymer may be reacted with the epihalohydrin by techniques well known to those skilled in the art, such as those described in U.S. Pat. No. 2,595,935. Broadly described, epihalohydrin is added to the substantially halide-free prepolymer in the presence of a solvent such as water, water miscible alcohols or mixtures thereof, at a temperature range of from about 0° C. to 45° C., preferably from about 10° to 35° C. over a period of 5 minutes to 60 minutes, preferably 10 minutes to 30 minutes. The solids concentration of the reactants in the reaction mixture during the reaction is from about 20% to about 60% by weight, preferably from about 30% to about 40%, based on the total weight of the reaction mixture. After addition is complete, the temperature is increased to about 50° to about 70° C. Reaction is continued at this temperature range until the resinous reaction product reaches a viscosity at 40% resin solids measured at 25° C. on the Gardner-Holdt scale of about A to about Z, preferably from about D to about H. The pH is reduced by the addition of a suitable acidic substance well known to those skilled in the art, such as $H_2SO_4$, HCl, etc.

The aqueous solutions may be adjusted to any resin solids concentration to facilitate use. Solutions having a resin solids level of from about 5% to 40%, preferably 20% to 35%, and a pH lower than 6 at 25° C., are stable for extended periods of time, i.e., over 3 months. A pH of 4 to 5 is preferred. Generally, the pH is always at least 3, so the solutions can be used in stainless steel equipment. Aqueous solutions having a high concentration of resin solids are preferred to reduce costs, especially when the solutions must be transported long distances.

Aqueous solutions of the novel resinous compositions are particularly valuable in increasing the wet strength of paper. Generally, they contain 5% to 40% of uncured resin solids, preferably 20% to 35%; and 60% to 95%, preferably 65% to 80% by weight of water, based on the total weight of the aqueous solution. Any concentration of the uncured resin solids may be used to increase the wet strength of paper except as limited by handling conditions. Likewise, they can be used at any viscosity except as limited by handling conditions.

The invention is illustrated by, but not limited to, the following Examples.

EXAMPLE I

This Example illustrates the preparation of a prepolymer from 1,6-hexamethylenediamine and 1,2-dichloroethane and its subsequent reaction with epichlorohydrin according to the prior art procedures.

A. Amine Prepolymer

Fifty-eight grams (0.5 mole) of 1,6-hexamethylenediamine were placed in a 4-necked flask equipped with a thermometer, mechanical stirrer, condenser and an additional funnel. Then, 10.2 grams of water were added and the mixture heated to 70° C. Forty-two grams (0.43 mole) of 1,2-dichloroethane were added at a rate slow enough to keep the reaction temperature below 75° C. (~3 hours addition time). Water, 8 grams at a time, was added during this 3 hour period to keep the reaction viscosity below Gardner S. When the addition of 1,2-dichloroethane was completed, 8 grams of 50% aqueous sodium hydroxide were added. The reaction mixture was maintained at 70° C, until the viscosity reached Gardner V. At this point, 8 grams of water were added and the temperature increased and maintained at 80° C. until the viscosity reached Gardner T. Thereafter, 315 grams of water were added and the mixture cooled to 25° C.

B. Epichlorohydrin Reaction

To the above amine prepolymer 184.8 grams (2 moles) of epichlorohydrin were added over a 1-hour period, and the reaction temperature was permitted to rise to about 45° C. After an additional hour at 45° C., the reaction temperature was increased to 65° C. and maintained at this temperature until the viscosity of the solution reached Gardner D. Then, 9 grams of 98% by weight sulfuric acid together with 227 grams of water were added. The final pH was adjusted to about 4, and the final solids diluted with water to about 25% solids. A solution weighing 1,200 grams containing 25% solids and having a pH of 4.5 at 25° C. was obtained. Analysis of the solution indicated that only about 80 mole % of the epichlorohydrin reacted with the amine prepolymer.

EXAMPLES II – IX

These Examples illustrate the preparation of resinous reaction products according to the present invention.

A. Amine Prepolymer

The general procedure of Example I was followed for the reaction of the 1,6-hexamethylenediamine and the 1,2-dichloroethane except that the mole ratios were changed as set forth in Table I. After the reactions were complete, the contents of the reaction flask were transferred to a 2-liter separatory funnel and maintained at about 75° C. Then, an equal volume of 50% sodium hydroxide solution at about 75° C. was added to the separatory funnel, and the funnel shaken vigorously for about 1 minute. Two phases rapidly appeared; the top layer was the amine prepolymer, and the bottom layer was the aqueous solution. The bottom layer containing sodium chloride and sodium hydroxide was drawn off and discarded. The top layer was diluted with water and cooled.

B. Epichlorination Reaction

The amine prepolymer washed with hot sodium hydroxide and the epichlorohydrin were reacted according to the general procedure of Example I except that less epichlorohydrin was used, and at a lower temperature. The results are set forth in Table I.

TABLE I

| EXAMPLE | DCE/HMD[a] | E/A[b] | MOLE % YIELD |
|---------|-----------|--------|--------------|
| II | 0.75 | 1.8 | 86.9 |
| III | 0.75 | 1.7 | 88.0 |
| IV | 0.60 | 1.6 | 90.8 |
| V | 0.40 | 1.6 | 97.8 |
| VI | 0.50 | 1.6 | 91.5 |
| VII | 0.50 | 1.6 | 92.5 |
| VIII | 0.50 | 1.5 | 94.4 |
| IX | 0.60 | 1.65 | 90.5 |

[a]Mole ratio of 1,2-dichloroethane to 1,6-hexamethylenediamine in amine prepolymer.
[b]Mole ratio of epichlorohydrin to amine group in the prepolymer.

EXAMPLE X

The resinous reaction products of the present invention were used in paper by the following procedure. Hand sheets were made using a Nobel and Wood apparatus with a pulp of 50% bleached hard wood kraft and 50% bleached soft wood kraft having a Canadian Standard Freeness of about 457. The resinous reaction products of the present invention were added to the pulp at a level of about 5 grams per kilogram of dry paper. The hand sheets were made and dried at about 90° C. for 15 seconds to duplicate off-machine paper. The wet strength was measured by an Instron Tensile Tester using a single-ply strip, 2.54 centimeters wide, which had been wet with 0.6 centimeter brush stroke 10 seconds before pull began. Dry strength was measured on a sheet of paper which had not been wet. The results, which are comparable to those obtained using commercial papermaking machines, are presented in Table II. The resin of Example I is included for comparative purposes.

TABLE II

| RESIN EXAMPLE | DRY STRENGTH (g/cm) | WET STRENGTH (g/cm) |
|---------------|---------------------|---------------------|
| I | 2965 | 595 |
| II | 3143 | 638 |
| III | 3179 | 661 |
| IV | 3018 | 600 |
| V | 3126 | 625 |
| VI | 3036 | 611 |
| VII | 3108 | 650 |
| VIII | 3179 | 623 |
| IX | 3215 | 632 |

EXAMPLE XI

A series of seven amine prepolymers were made according to the procedure of Examples II and III. The amine prepolymers washed with hot sodium hydroxide were reacted with epichlorohydrin in a mole ratio of epichlorohydrin to amine group in the amine prepolymer of 1.3 to 1. The mole % yield averaged 98%.

Hand sheets were made according to the procedure of Example X, except that a wider range of resinous reaction products in the pulp were used. Wet strength was then determined. The following results, which are an average of seven determinations, were obtained:

| RESINOUS PRODUCT CONCENTRATION* | WET STRENGTH (g/cc) |
|---|---|
| 2.5 | 580 |
| 5 | 750 |
| 7.5 | 875 |

*Grams of resinous reaction product per kilogram of dry paper.

Although the invention has been described in terms of specified embodiments which are set forth in considerable detail, it should be understood that this is by way of illustration only and that the invention is not necessarily limited thereto since alternative embodiments and operating techniques will become apparent to those skilled in the art in view of the disclosure. Accordingly, modifications are contemplated which can be made without departing from the spirit of the described invention.

What is claimed is:

1. A method for preparing a resinous composition which comprises:
   A. forming an amine prepolymer containing a hydrohalide,
   B. removing a substantial amount of the halide ion from the amine prepolymer, and thereafter,
   C. contacting the substantially halide-free amine prepolymer with an epihalohydrin.

2. A method of claim 1 wherein the amine prepolymer is formed by polymerizing diallylamine hydrohalide.

3. A method of claim 1 wherein the amine prepolymer is formed from the reaction product of:
   1. a dihaloalkane represented by the formula

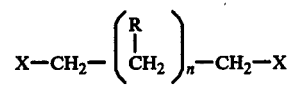

wherein X represents chloro, bromo, or iodo, R is hydrogen, hydroxy or alkyl group having 1 to 4 carbon atoms, and n is 0 to 1, and
   2. a polyalkylenepolyamine represented by the formula

wherein m is an integer of from 2 to about 15 and p is 0 to 3 in a mole ratio of from about 0.3:1 to about 1:1.

4. A method of claim 3 wherein the amine prepolymer is formed from the reaction product of a dihaloalkane and a polyalkylenepolyamine in a mole ratio of about 0.4:1 to about 0.9:1.

5. A method of claim 3 wherein the substantially halide-free amine prepolymer is contacted with from about 0.8:1 to about 2:1 moles, based on the moles of amine group, of an epihalohydrin selected from the group consisting of epichlorohydrin, epibromohydrin and epiiodohydrin.

6. A method of claim 1 wherein a substantial amount of the hydrohalide and residual halide is removed from the amine prepolymer by contacting the amine prepolymer with a sufficient amount of an alkali metal hydroxide to react with a substantial amount of the hydrohalide and residual halide at about 50° C. to about 100° C., and thereafter separating the amine prepolymer from alkali metal salts.

7. A method of claim 6 wherein the amine prepolymer is contacted with a 50% sodium hydroxide solution.

8. A resinous composition comprising the reaction product of a substantially halide-free polymer of diallylamine which has been prepared from a halide-containing diallylamine prepolymer and from about 0.1 to about 2.0 moles of an epihalohydrin per mole of amine group.

* * * * *